April 9, 1968  C. E. MILLER  3,376,620
DRIVE MECHANISM FOR BOWED ROLLS
Filed Jan. 3, 1966  3 Sheets-Sheet 1
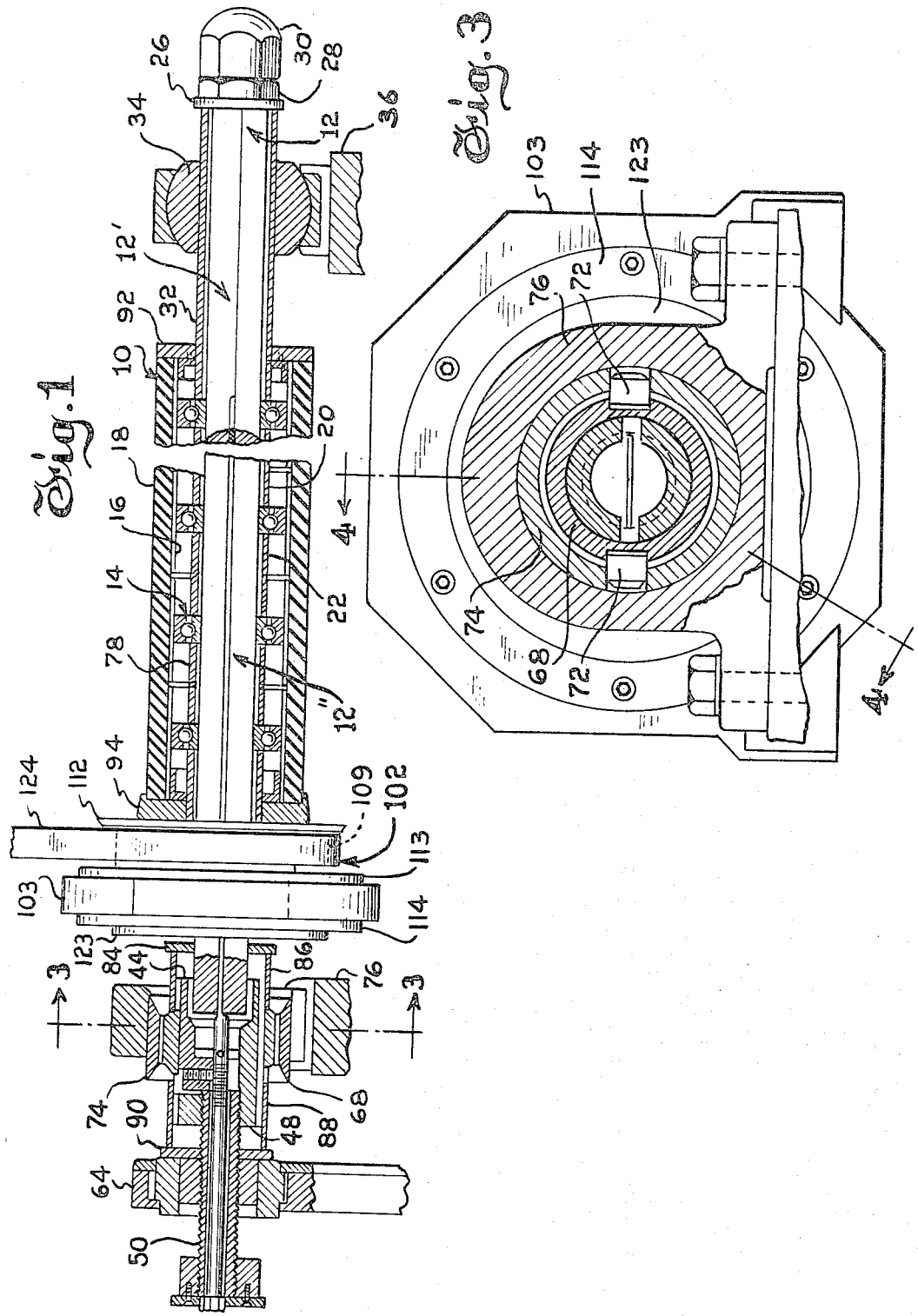

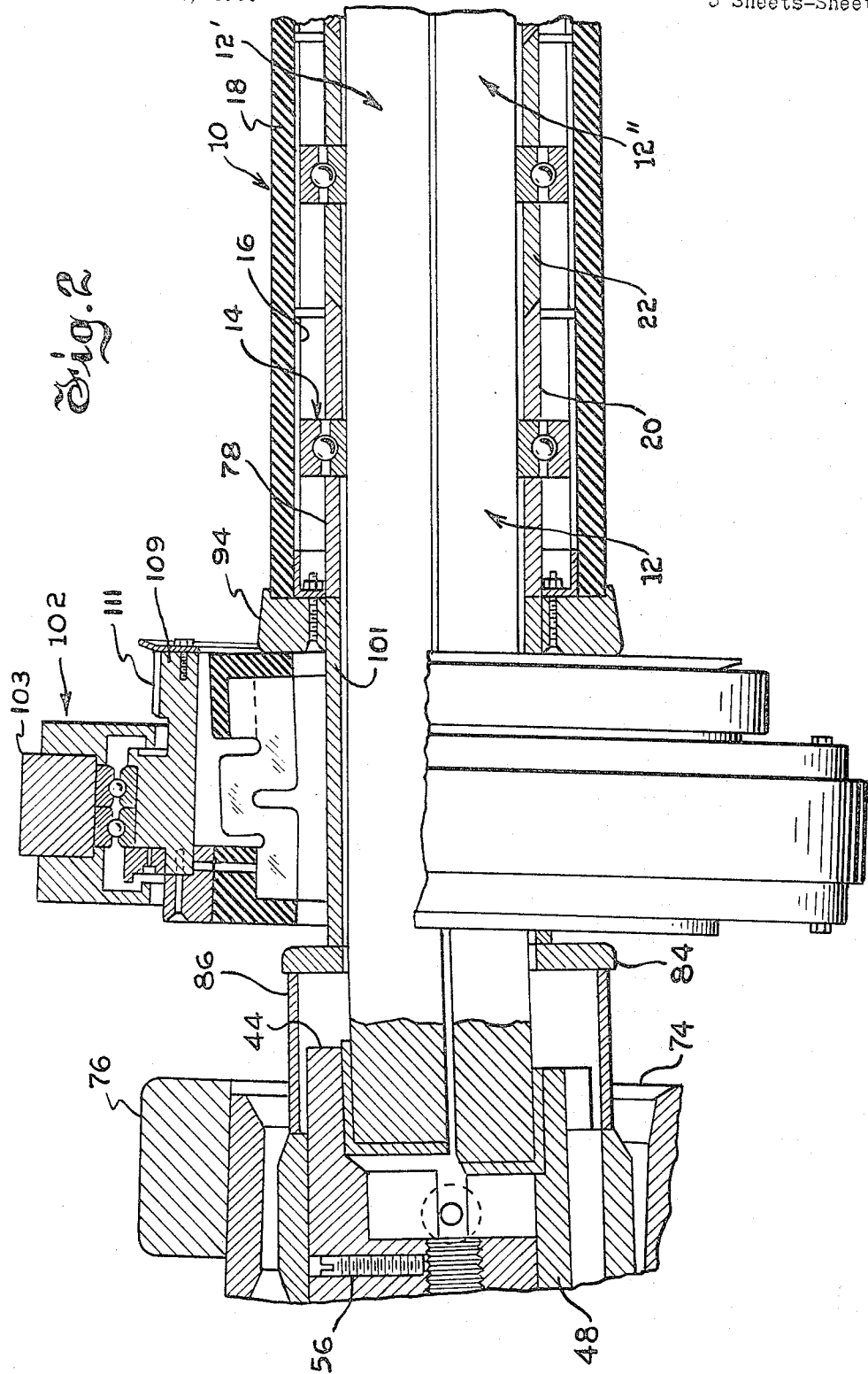

April 9, 1968 C. E. MILLER 3,376,620
DRIVE MECHANISM FOR BOWED ROLLS
Filed Jan. 3, 1966 3 Sheets-Sheet 3

United States Patent Office 3,376,620
Patented Apr. 9, 1968

3,376,620
DRIVE MECHANISM FOR BOWED ROLLS
Charles E. Miller, Dayton, Ohio, assignor to Kimberly-Clark Corporation, Neenah, Wis., a corporation of Delaware
Filed Jan. 3, 1966, Ser. No. 518,333
2 Claims. (Cl. 26—63)

ABSTRACT OF THE DISCLOSURE

Power transmission apparatus for driving a bowed sheet carrying roll which may be adjusted in curvature and including a sleevelike member surrounding the roll and rotatably disposed on a fixed axis and a rubberlike coupling sleeve connecting the sleevelike member and an external part of the roll for driving the roll in any of its adjusted positions.

---

The invention relates to rolls of the type which are effective for expanding and contracting flexible sheet material traveling over the rolls and which have a longitudinal curvature that may be varied to change the expanding and contracting effect, and more particularly the invention relates to driving mechanism for such a roll.

Longitudinally curved rolls are variously employed for laterally expanding flexible sheet webs such as paper, cloth, plastic, etc. to remove wrinkles and to insure that the web leaving such a curved roll will approximate a predetermined width. In various uses, such rolls are driven in timed relationship to other moving parts, such as for example, in timed relationship to the speed of drier drums, endless felts, Fourdrinier wires, etc. in papermaking machines.

Ordinary driving belts, such as V-belts, running over drive and driven sheaves, have previously, most usually, been used for driving such rolls; however, these belts do not accurately time the speed of rotation of such a longitudinally curved roll with other parts; and, therefore, toothed belts have been substituted which accurately time the speed of roll rotation with the speed of other parts. However, in view of the fact that such a longitudinally curved roll may be varied in its curvature and may also be rotated so that the plane containing the curved axis of the roll is rotated about fixed centers, angular misalignment and change in distance between a drive sheave on a fixed axis and a driven sheave carried by the longitudinally curved roll result. The angular misalignment occurring with prior constructions caused the belts to run off the sheaves, and the increased center distances of the sheaves resulted in breakage of the belts.

It is an object of the invention to provide an improved drive for such an adjustable longitudinally curved roll which is of such construction and arrangement that the drive and driven sheaves remain fixed on axes that are parallel and predetermined distances apart whereby there is no angular misalignment between the sheaves tending to cause a drive belt to run off the sheaves and there can be no increase in center distances between the sheaves to cause stretching and breakage of a drive belt. More particularly, it is an object of the invention to provide an improved drive mechanism for such a roll having a driven sheave rotatable mounted on a fixed center and connected by means of a flexible member with the roll for allowing adjustment of the roll without a change in position of the driven sheave.

The invention consists of the novel constructions, arrangements and devices to be hereinafter described and claimed for carrying out the above stated objects, and such other objects, as will be apparent from the following description of a preferred form of the invention, illustrated with reference to the accompanying drawings, wherein:

FIG. 1 is a longitudinal sectional view of a roll which is adjustably mounted and adjustably curved on a nonrotatable axle and with which the improved drive mechanism of the invention may be utilized;

FIG. 2 is a fragmentary view similar to FIG. 1 and showing on a larger scale portions of the roll and mounting means located at the lefthand end of the roll as illustrated in FIG. 1, the roll and its axle having longitudinal curvature introduced therein and the drive mechanism of the invention being shown adjacent the left end of the roll;

FIG. 3 is a sectional view taken on line 3—3 of FIG. 1; and

Like characters of reference designate like parts in the several views.

Figure 4:
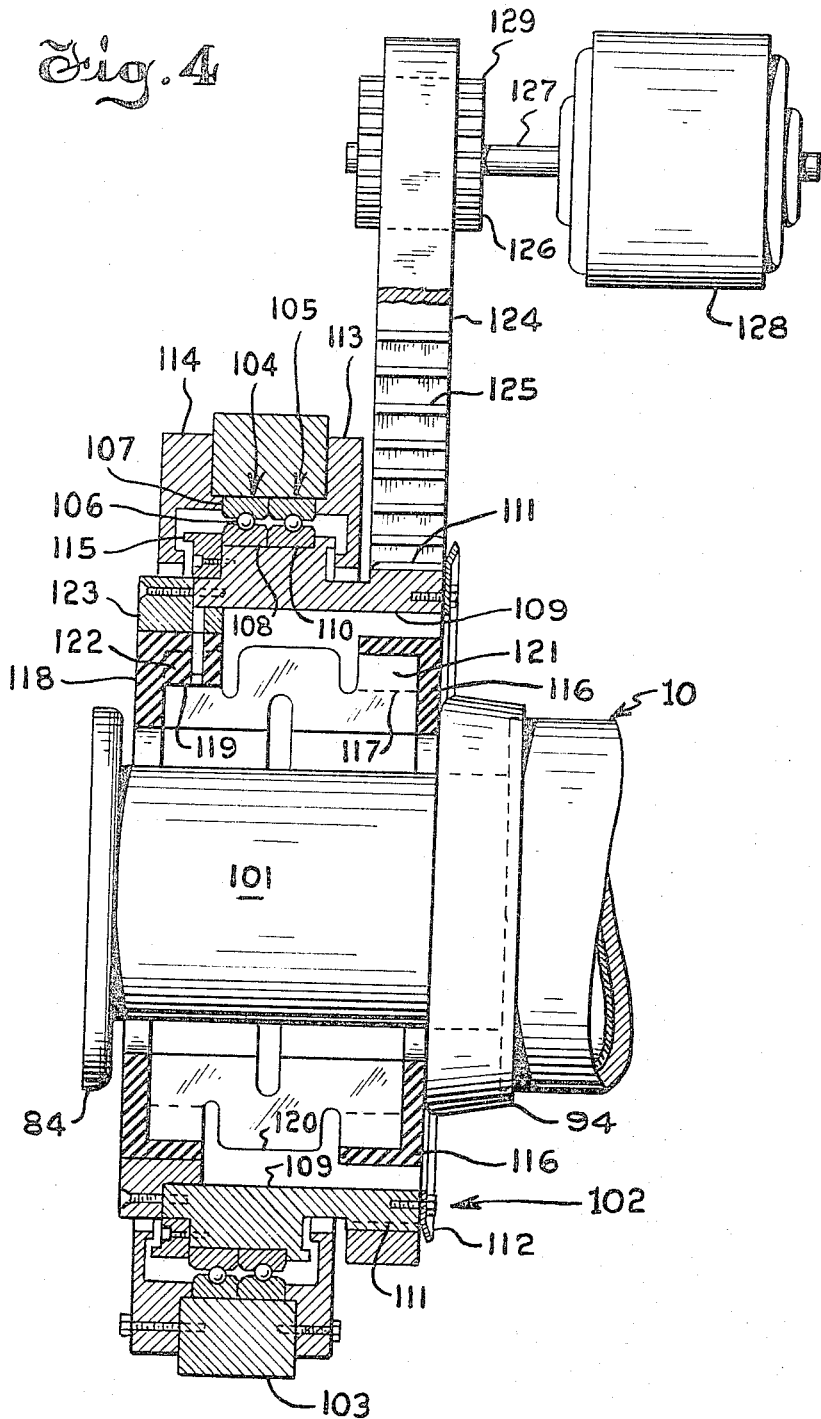
FIG. 4 is a longitudinal sectional view of the drive mechanism of the invention shown connected with an electric driving motor.

The drive mechanism of the invention may be used, for example, with the longitudinally curvable roll disclosed in the patent to J. D. Robertson, No. 2,898,662, issued Aug. 11, 1959, and reference numerals below 100 used in the present drawings indicate parts which are identical with the corresponding numbered parts shown in the Robertson Patent 2,898,662. The only substantial difference between the rolls shown in Robertson Patent 2,898,662 and that illustrated in the present drawings is that the Robertson ring element 80 has been re-designed and lengthened so as to constitute ring element 101 in the present drawings, and the axle parts 12' and 12" have been correspondingly lengthened in order to provide room on the axis of the roll for the improved drive mechanism 102.

The Robertson Patent 2,898,662 may be referred to for a detailed description and statement of operation of the roll illustrated herein; however, in brief, the roll 10 illustrated herein may be seen to comprise an axle 12 which is split so as to have parts 12' and 12". Ball bearing units 14 are disposed between the axle 12 and sleeves 16, and the roll comprises a flexible surface sleeve 18 disposed on the sleeves 16.

Spacing elements 20, 22 are disposed between the bearings 14 around the axle 12 and accommodate curvature in the axle 12 due to the formation on the ends of the elements 20, 22. Lock nuts 28, 30 are provided on one end of the axle 12, and an abutment element 26 is backed by the lock nuts. A relatively long spacing sleeve 32 is loose on the axle 12 between the abutment element 26 and the endmost bearing unit 14.

The axle portion 12' is welded to a member 44, and the axle portion 12" is welded to a member 48. A threaded tube 50 extends through the member 48 into engagement with the member 44.

The right end of the roll 10 is pivotally mounted with respect to a bearing member 36 by means of a bearing element 34, and the left end of the roll is pivotally mounted with respect to a bearing support 76 by means of trunnions 72 extending through a bearing element 68 and into an element 74 slidably disposed within the bearing support 76.

Suitable thrust elements are inserted around axle 12 between the pivoted bearing element 68 and the endmost bearing unit 14 at the lefthand portion of the roll including the ring element 78, the elongated ring element 101, a washer 84 and a ring element 86. A washer 90 loose on tube 50 and having a spacer element 88 between it and the bearing element 68, is engaged by a nut 64 on the threaded tube 50; and, hence by screwing nut 64 inwardly on the tube 50, all of the ring and spacer elements may be put under longitudinal compression. A curvature is introduced into the roll by screwing the tube 50 inwardly with respect to the member 48, and this effects outward movement of the axle portion 12" and inward movement of axle portion 12' causing the axle to assume a bowed condition as shown in FIG. 2. The pivoted bearing supports, 34, 68 adjust themselves to suit any introduced bowing of the axle.

Any suitable end caps 92, 94 may close the ends of the roll body 10, and the cap 94 is utilized for driving the roll 10. The driving mechanism 102 for the roll comprises a bearing housing 103 which is fixed with respect to the frame of a papermaking or other machine in which the roll 10 is used. A pair of ball bearing units 104 and 105, each comprising a plurality of ball 106 disposed in rolling relation within an outer raceway 107 and on an inner raceway 108, are provided in the bearing housing 103. An annular sprocket 109 has a peripheral groove 110 for receiving the inner raceways 108, and the sprocket 109 is thus rotatably disposed within the bearing housing 103. The sprocket 109 is provided with a series of peripheral teeth 111, and an annular sheave flange 112 is screwed onto the sprocket 109 at the ends of the teeth 111.

A back bearing retainer 113 and a front bearing retainer 114 are fixed to the opposite sides of the bearing housing 103, and an inside bearing retainer ring 115 is fixed to the sprocket 109; and, as will be apparent, the parts 113, 114 and 115 cooperate to maintain the bearings 104 and 105 in their illustrated positions with respect to the bearing housing 103 and sprocket 109.

An annular coupling flange 116 is fixed with respect to the end cap 94, and the flange is provided with a series of internal teeth 117. An annular coupling flange 118 is disposed oppositely with respect to the flange 116, and the flange 118 is provided with internal teeth 119 therein. A sleeve-like member 120 of rubber-like material extends between the coupling flanges 116 and 118, and the member 120 has external teeth 121 and 122 on its ends which mate with the teeth 117 and 119 provided within the flanges 116 and 118. A flange retaining ring 123 is fixed with respect to both the sprocket 109 and the coupling flange 118 so as to couple the sprocket 109 to the flange 118.

A belt 124 extends over the toothed end portion of the sprocket 109 and has internal teeth 125 that interengage with the teeth 111 on the sprocket 109. The belt 124 also extends over a drive sprocket 126 fixed on the driven shaft 127 of a prime mover 128, which may be an electric motor, for example. The sprocket 126 has teeth 129 which intermesh with the teeth 125 on the belt 124. The motor 128 is also fixed with respect to the same frame on which the bearing housing 103 is fixed, and the axes of the sprockets 109 and 126 are fixed with respect to each other and extend parallel to each other.

In operation, the motor 128 drives the sprocket 109 by means of the sprocket 126 and the belt 124. The sprocket 109 rotates in axially fixed relationship with respect to the fixed bearing housing 103, and the sheave flange 112 and the back bearing retainer 113 function to assure that the belt 124 remains in fully intermeshed condition with the teeth 111 on the sprocket 109. In this connection, it should be noted that sprockets 126 and 109 have their axes a fixed distance apart and parallel; and there is, therefore, no substantial force tending to move the belt 124 out of mesh with the sprockets 126 and 109.

The sprocket 109 is drivingly connected with the flange 116 and thereby with the cap 94 and roll 10 by means of the flange retaining ring 123, the flange 118 and the rubber coupling sleeve 120. The roll 10 is thus driven at the same speed of rotation as the sprocket 109; and, in view of the fact that the belt 124 is internally toothed and the sprockets 109 and 126 are externally toothed, there is a certain fixed speed relationship that exists between the motor 128 and the roll 10.

The rubber coupling sleeve 120 allows the bowing of the roll 10 to be changed as desired without changing the position of the driven sprocket 109 and, therefore, without changing the relationship of the sprocket 109 with the sprocket 126 and the drive belt 124. If the roll 10 is bowed upwardly as is illustrated in FIG. 2, the upper peripheral surface of the flange 116 approaches the sprocket 109 more closely, while the lower peripheral surface of the flange 116 is spaced farther from the lower peripheral surface of the sprocket 109; and the coupling sleeve 120 flexes to allow this movement and to transmit drive torque from the sprocket 109 to the roll 10 to drivingly rotate the roll at a speed determined by the number of teeth on the sprockets 109 and 126. The plane of the bowed roll 10 may also be rotated about the longitudinal centers of the bearing suppports 36 and 76 as desired, and the sleeve 120 will flex as necessary in order to accommodate itself to this movement and to the driving of the roll 10 in this changed condition. It is desirable in a papermaking machine, for example, using this type of longitudinally curved roll, that the curvature of the roll be changed and that the plane containing the curved axis of the roll be adjustably rotated under changing operating conditions in order that the paper sheet may be correctly manipulated by the roll so as to remove wrinkles and to insure that it has a predetermined width as it leaves the curved roll. The drive mechanism 102, as just described, accommodates itself to such adjustment of the roll 10 while yet driving the roll 10 at a predetermined speed of rotation, which may for example, be the same as the speed of travel of the paper web carried by the roll 10.

In order to allow easy assembly of the drive mechanism with respect to the roll 10, the coupling flanges 116 and 118 and the rubber coupling sleeve 120, which have smaller internal diameters than the diameter of the roll 10, are preferably made split, with the opposite halves of each of these parts being fixed together as by means of screwing. These parts then may be easily put into position without dissassembling the roll 10 from the frame or other support on which the roll 10 is mounted.

Advantageously, the flexible member 120, being rubber, does not need lubrication; and, therefore, a long satisfactory life may be expected from the drive mechanism. The drive mechanism is compact; it is relatively simple in construction and has few moving parts; and it may be constructed at a relatively low cost.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. In combination, a longitudinally bowed roll adapted to have a web of sheet material passed thereover, means for mounting the roll so that the bowing may extend in different directions, means for adjusting the curvature of the roll, a sleeve-like member surrounding said roll, means for rotatively disposing said member on a fixed axis, means for driving said member, a first flanged portion fixed to and within said sleeve-like member, a second flanged portion fixed on the exterior surface of said roll, and a rubber-like coupling sleeve extending between said flanged portions and being fixed against rotation with respect to each of said portions for transmitting torque from said sleeve-like member to said roll.

2. In combination, a longitudinally bowed roll adapted to have a web of sheet material passed thereover, means for mounting the roll at the ends of the roll so that the bowing may extend in different directions, means for adjusting the curvature of the roll, a sleeve-like member surrounding said roll adjacent but spaced from one end thereof, means for rotatably disposing said member on a fixed axis and including a stationary element surrounding the roll and bearing means between said element and member, means for driving said sleeve-like member, and a sleeve of resilient material fixed at one end with respect to said sleeve-like member and fixed at its other end with respect to an outer part of said roll for transmitting torque from said sleeve-like member to said roll.

References Cited

UNITED STATES PATENTS

| | | | |
|---|---|---|---|
| 1,915,399 | 6/1933 | Bibby | 64—15 |
| 2,689,392 | 9/1954 | Robertson | 26—63 |
| 2,712,681 | 7/1955 | Warner | 26—63 |
| 2,712,682 | 7/1955 | Warner | 26—63 |
| 2,898,662 | 8/1959 | Robertson | 26—63 |
| 2,904,976 | 9/1959 | Bay et al. | 64—1 XR |
| 2,960,749 | 11/1960 | Robertson et al. | |

FOREIGN PATENTS 387,289  2/1933  Great Britain.

ROBERT R. MACKEY, *Primary Examiner.*